(12) United States Patent
Lugas et al.

(10) Patent No.: US 8,727,841 B2
(45) Date of Patent: May 20, 2014

(54) VENT APPARATUS

(75) Inventors: Grant A. Lugas, Elyria, OH (US); Lee S. Weinerman, Medina, OH (US)

(73) Assignee: The Eastern Company, Cleveland, OH (US)

( * ) Notice: Subject to any disclaimer, the term of this patent is extended or adjusted under 35 U.S.C. 154(b) by 1200 days.

(21) Appl. No.: 12/605,401

(22) Filed: Oct. 26, 2009

(65) Prior Publication Data

US 2011/0097983 A1    Apr. 28, 2011

(51) Int. Cl.
*B60H 1/24* (2006.01)
*F24F 7/00* (2006.01)

(52) U.S. Cl.
USPC .......................................... 454/145; 454/254

(58) Field of Classification Search
USPC ......... 454/145, 118, 128, 134, 136, 143, 149, 454/273, 95–97, 94, 346, 326, 340; 292/262, 271, 265
See application file for complete search history.

(56) References Cited

U.S. PATENT DOCUMENTS

| | | | | |
|---|---|---|---|---|
| 1,412,613 | A | * | 4/1922 | Henvis ........................... 454/149 |
| 2,093,036 | A | * | 9/1937 | Dickason ....................... 454/149 |
| 3,046,865 | A | * | 7/1962 | Kelly .............................. 454/145 |
| 3,102,464 | A | | 9/1963 | Kelly et al. |
| 3,358,576 | A | | 12/1967 | Kelly et al. |
| 3,375,772 | A | | 4/1968 | Kelly et al. |
| 3,625,132 | A | * | 12/1971 | Smith ............................ 454/145 |
| 3,760,707 | A | | 9/1973 | Kelly |
| 3,839,950 | A | | 10/1974 | Kelly et al. |
| 3,860,995 | A | * | 1/1975 | Lautenschlager et al. ...... 16/332 |
| 4,452,129 | A | | 6/1984 | Kelley et al. |
| 4,519,645 | A | | 5/1985 | Kelly et al. |
| 4,522,115 | A | | 6/1985 | Kelly et al. |
| 5,020,425 | A | | 6/1991 | Kelly |
| 5,137,327 | A | | 8/1992 | Edmonds et al. |
| 5,370,576 | A | | 12/1994 | Krofchalk |
| D390,943 | S | | 2/1998 | Kelly |
| D393,707 | S | | 4/1998 | Kelly |
| 5,766,068 | A | | 6/1998 | Kelly |

(Continued)

FOREIGN PATENT DOCUMENTS

CN      1205953 A      1/1999

OTHER PUBLICATIONS

Salem Vent International, Inc.; U.S. trademark registration No. 2151516; Apr. 14, 1998.

*Primary Examiner* — Avinash Savani
*Assistant Examiner* — Vivek Shirsat
(74) *Attorney, Agent, or Firm* — Christopher L. Parmelee; Walker & Jocke

(57) ABSTRACT

A vent apparatus (10) comprises a perforated screen (12), a door (18), a guide (24), and a handle (26), and a lever assembly (30). The door is adjacent a first face (13) of the screen and includes at least one arm (20, 22) that extends through at least one slot in the screen. The guide (24) is mounted adjacent a second face (14) of the screen. The handle (26) is in pivoting connection with the at least one arm and is operative to move relative to the guide to cause the door to move between a closed position (62) to an open position (64). A lever assembly (30) extends from the handle in pivoting connection with the guide. As the handle moves, the lever assembly is adapted to maintain the handle sufficiently close to the guide such that at least a portion of the handle is operative to slide along the guide.

17 Claims, 19 Drawing Sheets

(56) References Cited

U.S. PATENT DOCUMENTS

| | | | |
|---|---|---|---|
| 5,797,791 A | 8/1998 | Humphrey et al. | |
| 5,983,450 A | 11/1999 | Pratt | |
| 6,106,385 A | 8/2000 | Humphrey et al. | |
| 6,126,538 A * | 10/2000 | Kelly et al. | 454/143 |
| 6,280,315 B1 | 8/2001 | Kelly | |
| D450,113 S | 11/2001 | Teskey | |
| D459,461 S | 6/2002 | Kelly | |
| D459,462 S | 6/2002 | Kelly et al. | |
| D461,551 S | 8/2002 | Teskey | |
| 6,478,670 B2 | 11/2002 | Kelly | |
| 6,514,135 B1 | 2/2003 | Kelly | |
| 6,558,246 B2 | 5/2003 | Kelly et al. | |
| 6,602,126 B1 | 8/2003 | Teskey | |
| D483,462 S | 12/2003 | Teskey | |
| 6,932,694 B2 * | 8/2005 | Jeffries | 454/145 |

* cited by examiner

VENT APPARATUS

BACKGROUND

A "two-way" hingeless vent is typically used in vehicles such as trucks to provide additional ventilation and cooling when a door to the vent is open. Also, when the door of the vent is closed, the door may seal the vent and prevent a flow of air and water into the vehicle through the vent. However, the compression forces used to maintain the door in a closed position as the vehicle moves, often makes such vents difficult to open. Thus, there exists a need for an improved "two-way" hingeless vent that is relatively easier to open and includes other features as will be apparent from the following description.

SUMMARY

The following is a brief summary of the subject matter that is described in greater detail herein. This summary is not intended to be limiting as to the scope of the claims.

An example embodiment of a vent apparatus (referred to herein as a "vent") may include a door that is operative to open in two different directions, so as to provide either an inflow of air into a moving vehicle or an outflow of air out of the moving vehicle. The vent may include a handle which is connected to a guide via a lever assembly. Movement of the handle to a first side of the guide, causes the door of the vent to open in a first direction (e.g., providing an inflow of air). Movement of the handle to a second opposite side of the guide, causes the door of the vent to open in a second direction (e.g., providing an outflow of air). Movement of the handle to a center position of the guide causes the door of the vent to close and prevent the inflow and outflow of air through the vent.

In an example embodiment, the guide may include a plurality of recesses (also referred to herein as "detents"). Also the handle may include a movable bolt that slides between a retracted and extended position with respect to the handle into and out of the detents. In addition, the vent may include a lever assembly. The lever assembly is adapted to maintain the handle sufficiently close to the guide (as the handle moves relative to the guide to open and close the door) such that the bolt is operative to slide along the guide into and out of the detents and move relative to the handle responsive to changes in distance between the guide and the handle.

Other aspects will be appreciated upon reading and understanding the attached figures and description.

DETAILED DESCRIPTION

Figure 1:
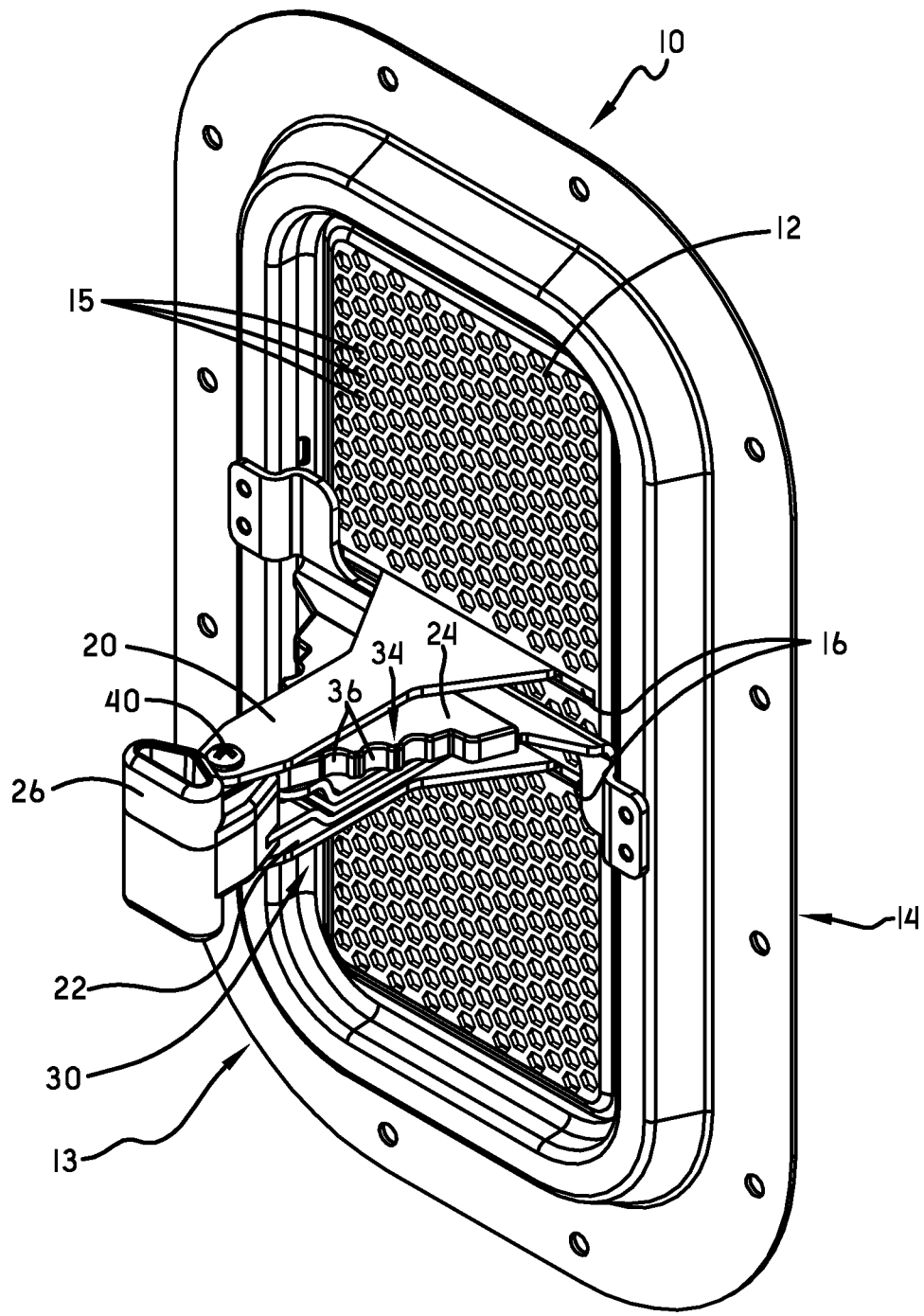
FIG. 1 is a perspective view of an example embodiment of a vent.

Various technologies pertaining to a vent apparatus will now be described with reference to the drawings, where like reference numerals represent like elements throughout.

With reference to FIG. 1, a back or rear view of an example embodiment of a vent apparatus (or "vent") 10 is illustrated. The vent 10 may include a perforated screen 12 having an interior face 13 and a corresponding exterior face (not shown in FIG. 1, but generally indicated as a face 14 located on the opposite side of the screen 12).

The screen 12 may correspond to a plate or other structure that includes a plurality of perforations 15 (i.e., holes) therethrough. Such perforations may correspond to small circular, hexagonal or other shaped holes created in the plate. However, in alternative embodiments other forms of screens with perforations therethrough may be used. For example, an alternative screen may include a wire mesh, a set of spaced apart parallel bars, or any other configuration of a perforated structure that is operative to permit airflow through the structure, while preventing the passing of unwanted objects (e.g. large bugs, road debris, etc.).

Figure 2:
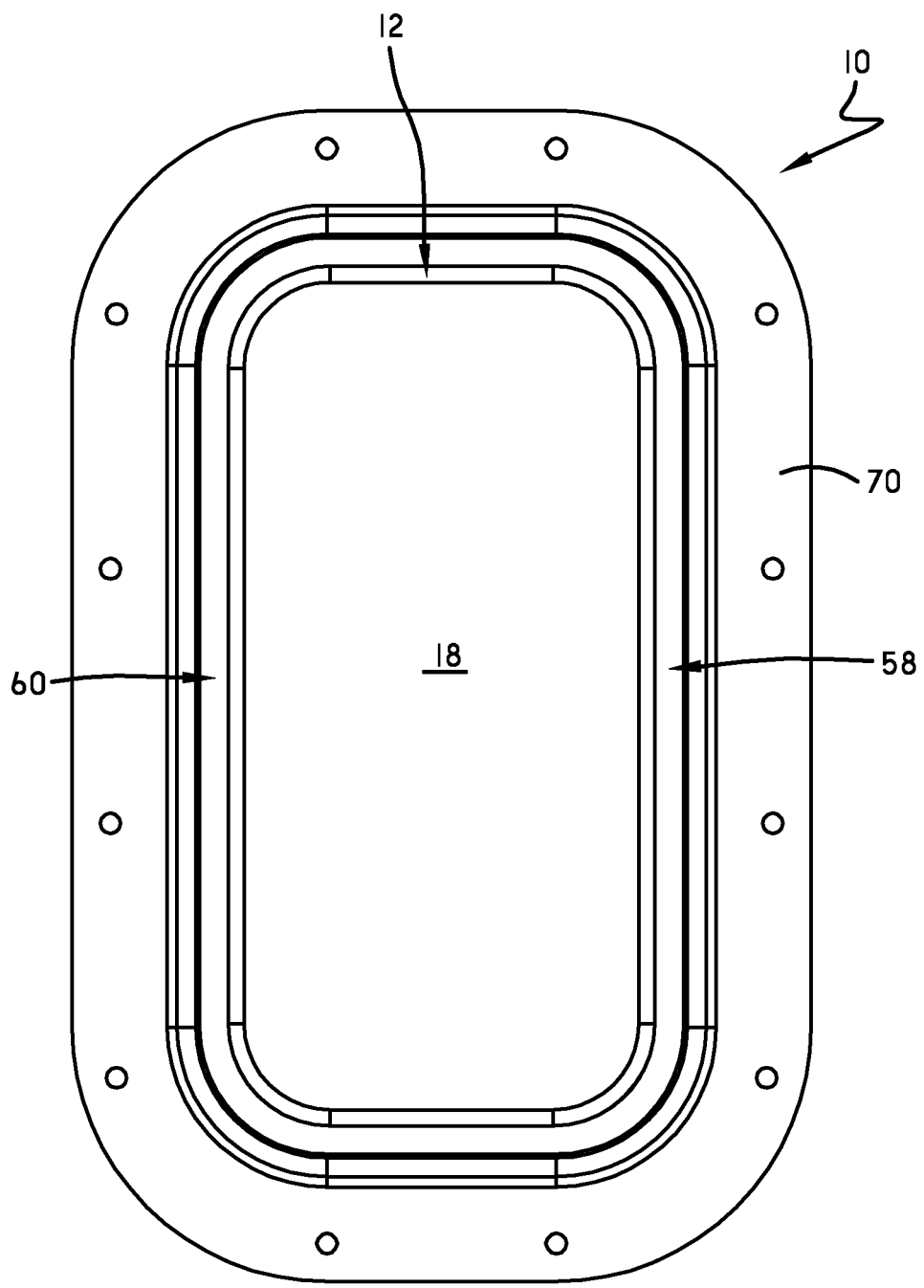
FIG. 2 is a front view showing a door of the vent.

FIG. 2 illustrates a front side view of the vent. Here the vent may include a door 18 adjacent the exterior face of the screen. FIG. 2 shows the door in a closed position in which the door is located in contact with the screen (or a frame 70 around the screen) and covers the perforations through the screen.

Figure 3:
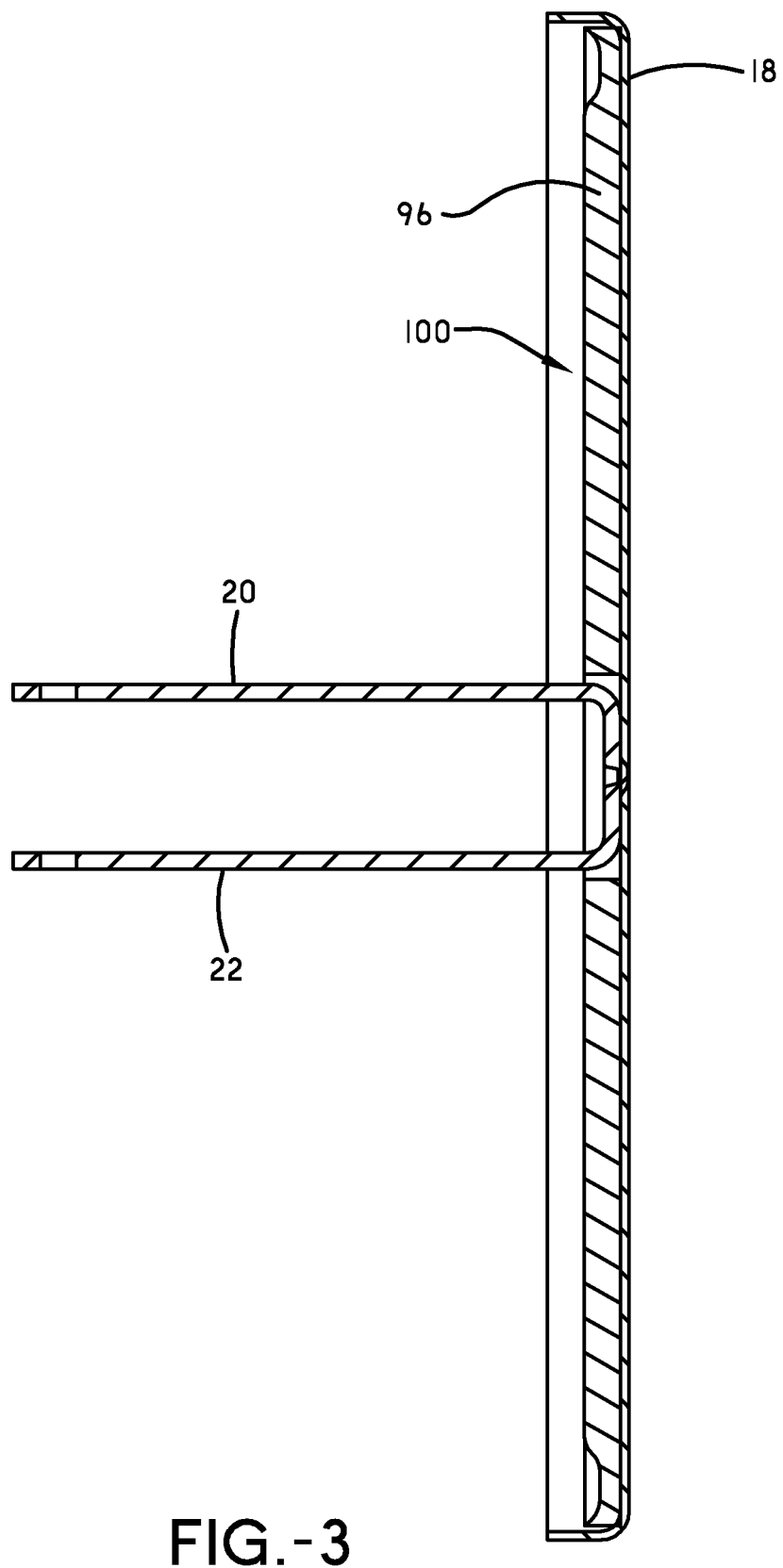
FIG. 3 is a cross-sectional view of the door.

As illustrated in FIG. 3 (showing the door 18 apart from the vent), the door 18 may include a seal 96 such as a foam sheet (or other compressible material) that is adhesively mounted to an inside surface of the door. When the door is in the closed position (as shown in FIG. 2), the door may compress the seal 96 against the exterior face of the screen in order to prevent (or at least substantially prevent) the inflow of air or water through the screen, and/or to reduce the transmission of road noises, and other sounds through the vent.

In addition, as shown in FIG. 3, the door 18 may include two or more spaced apart arms 20, 22 that extend from the door. Referring back to FIG. 1, the two spaced apart arms 20, 22 extend through at least one slot 16 in the screen. For example, the screen may include separate slots 16 (e.g., two) as shown in FIG. 1 which respectively receive the two arms of the door. However, in an alternative embodiment, rather than having two spaced apart slots 16 to receive the two arms of the door, the screen may include one relatively wider slot that is sized to receive both arms of the door therethrough.

As illustrated in FIG. 1, an example embodiment of the vent 10 may include a handle 26 that is in pivoting connection with the two spaced apart arms 20, 22. In addition, an example embodiment of the vent 10 may include a guide 24 mounted adjacent the interior face of the screen such that at least a portion of the guide is positioned between the spaced apart arms 20, 22 of the door that extend through the at least one slot 16 in the screen.

Figure 4:
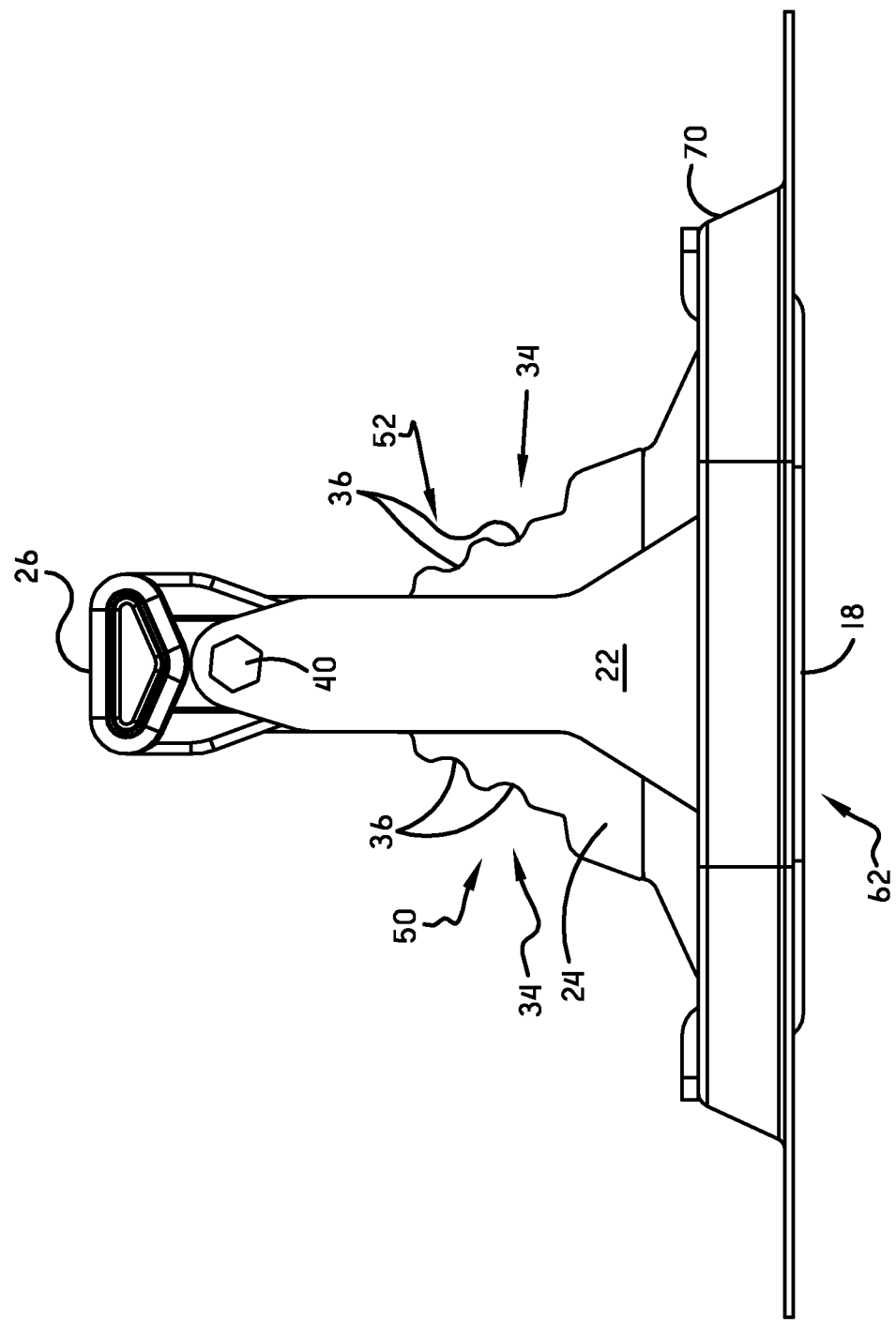
FIG. 4 is a bottom view of the vent with the door closed.
Figure 5:
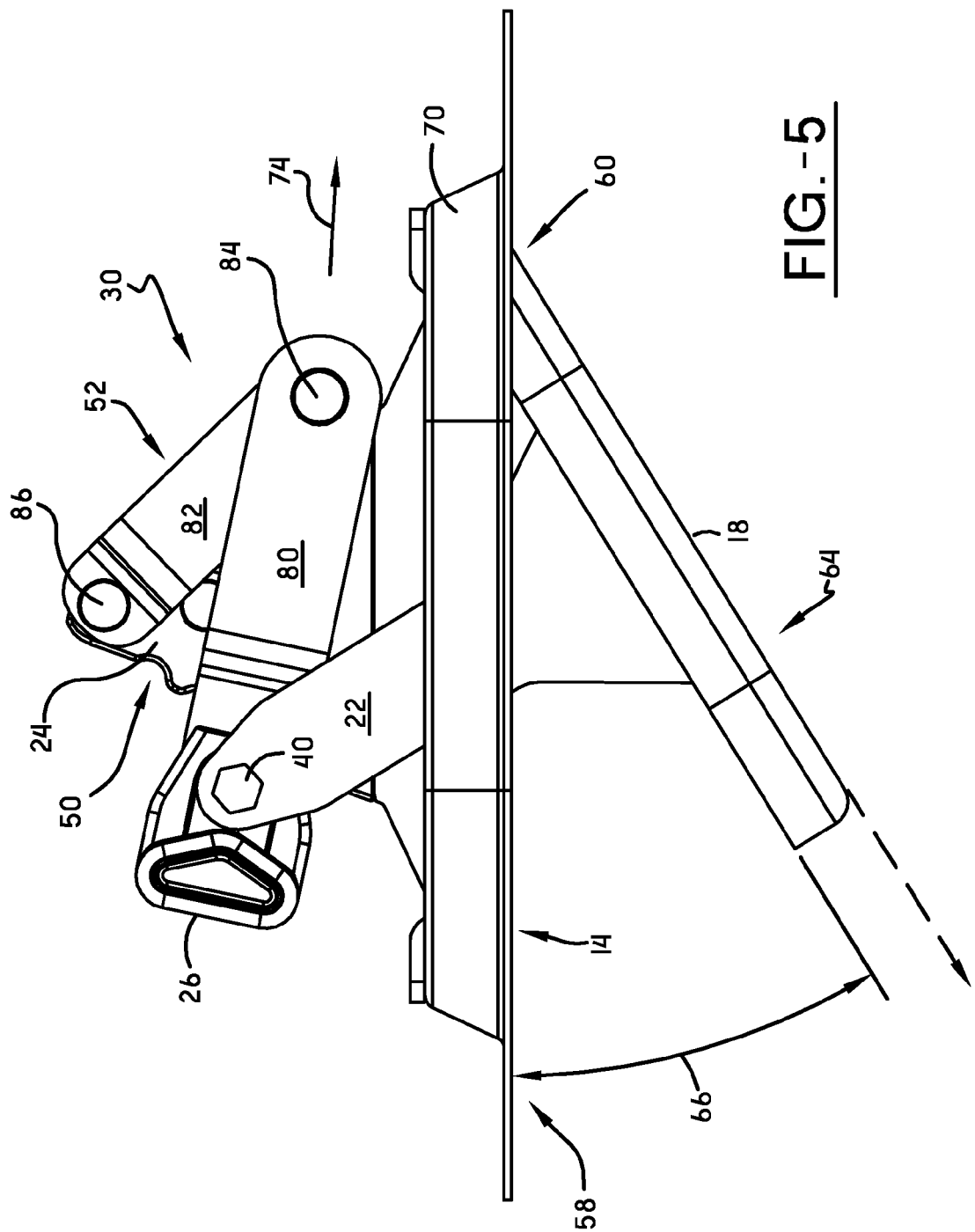
FIG. 5 is a bottom view of the vent with the door open in a first direction.
Figure 6:
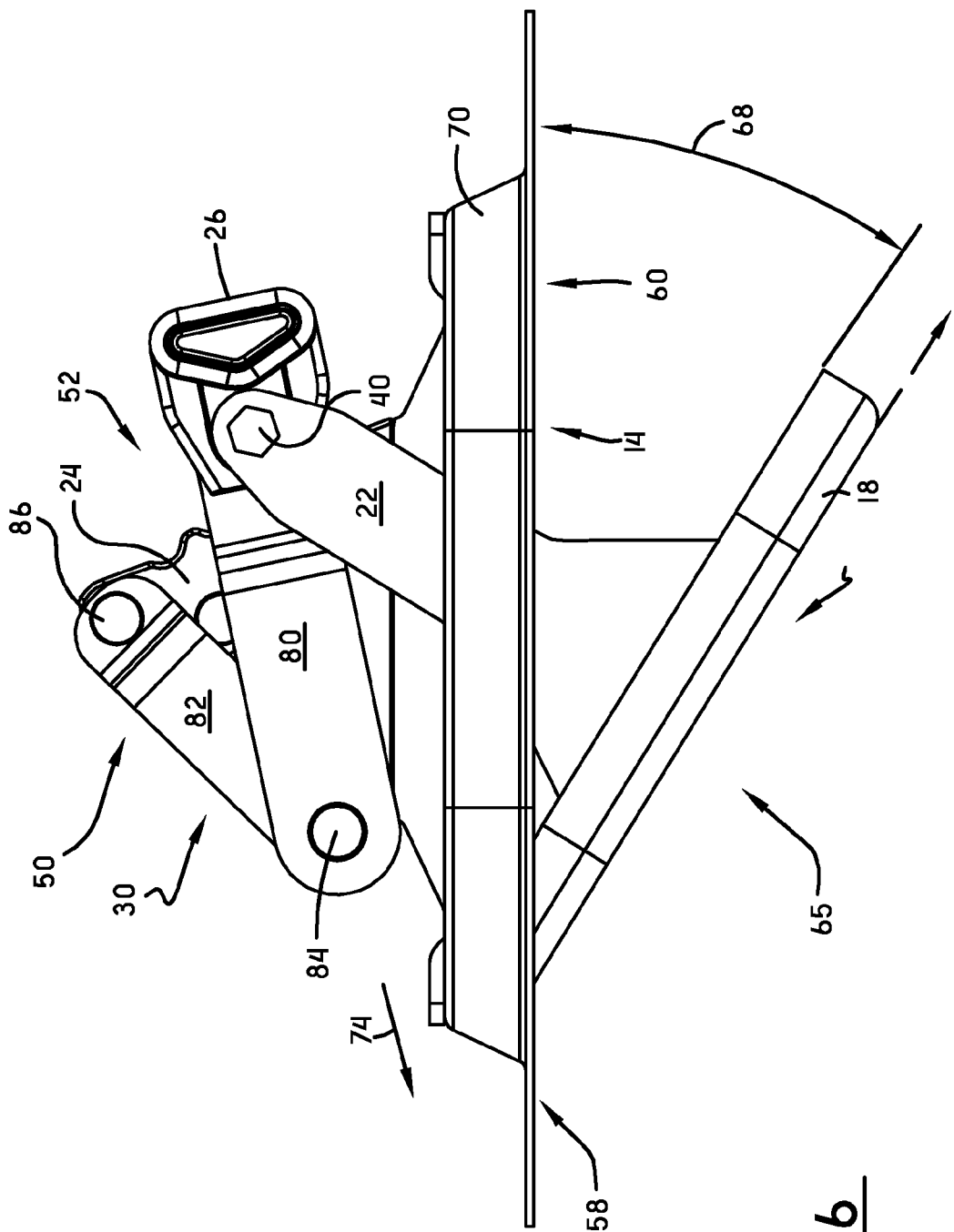
FIG. 6 is a bottom view of the vent with the door open in a second direction.

As illustrated in the bottom views of the vent in FIGS. 4-6, the handle 26 is operative to move relative to the guide 24 to cause the door 18 to move between a closed position 62 (shown in FIG. 4) adjacent the screen to one of a plurality of open positions 64, 65 (shown in FIGS. 5 and 6) extending at an acute angle with respect to the screen. In example embodiments, the guide 24 has a configuration such that the door 18 will open in different directions (as depicted in FIGS. 5 and 6) depending on which side of the guide the handle is moved.

Figure 7:
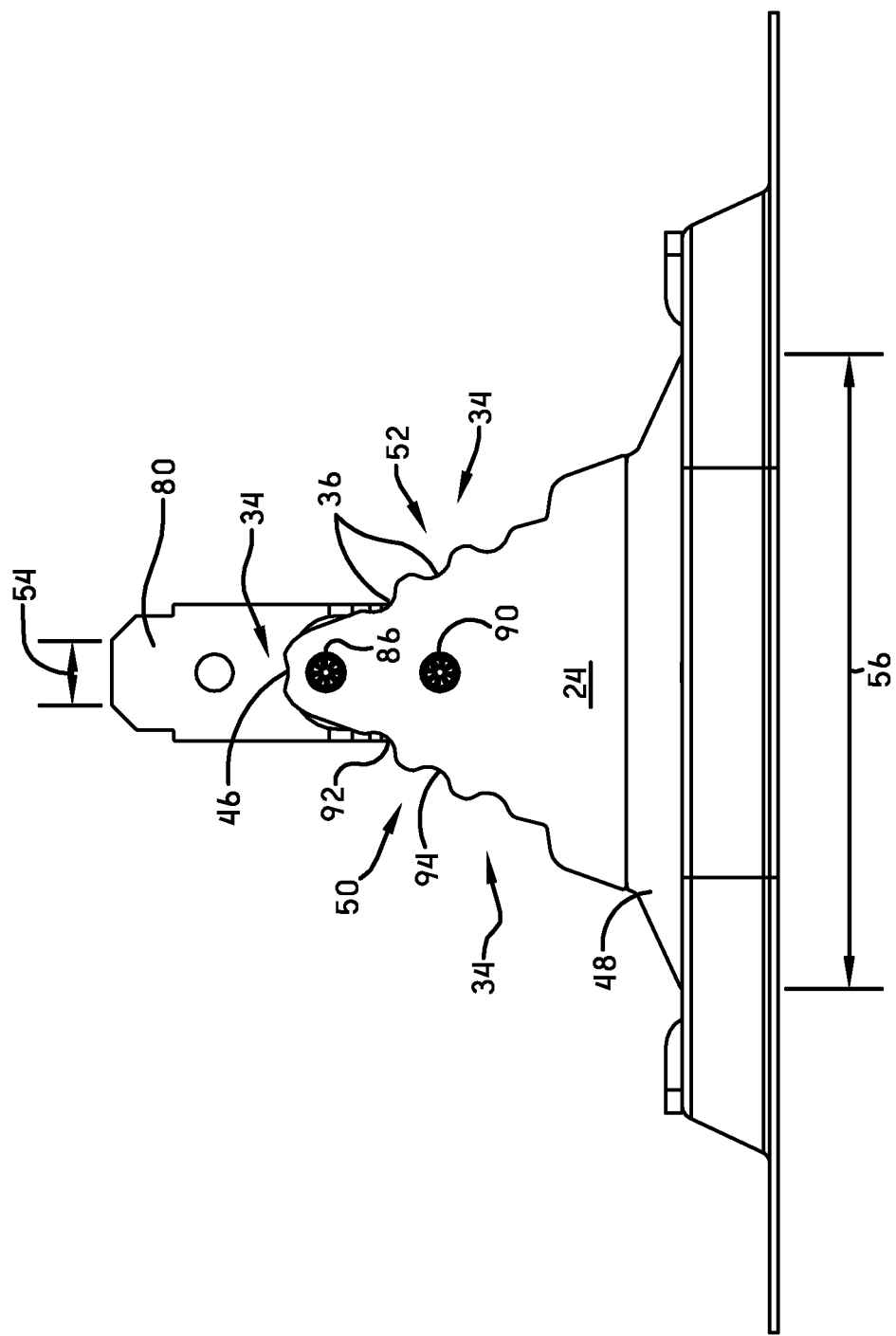
FIG. 7 is a side view showing features of a guide of the vent.

FIG. 7 illustrates an example configuration for the guide 24. Here the guide 24 may include generally centrally located apex 46. Also, the guide 24 may include a base 48 adjacent the screen of the vent. In addition, the guide may include two opposed first and second sides 50, 52 that extend from the apex to the base. In this example embodiment of the guide, the apex has a length 54 that is narrower than a length 56 of the base. As a result, the overall appearance of the guide may resemble a triangular shape.

Figure 8:
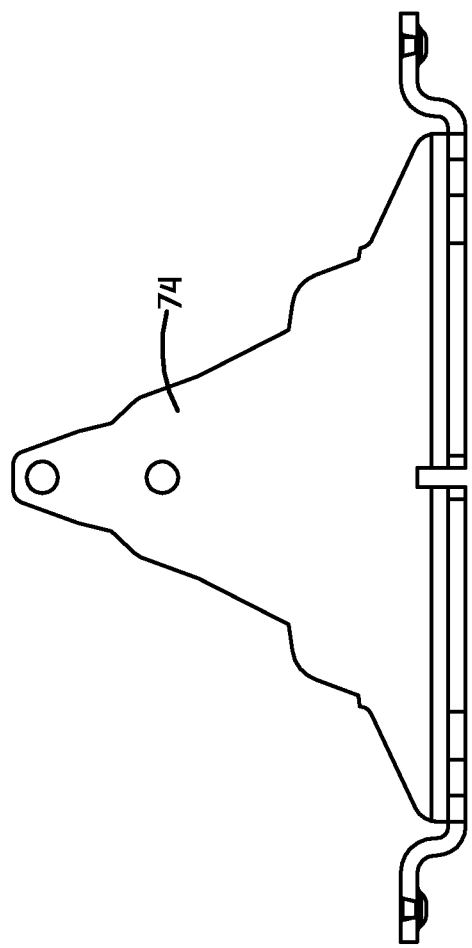
FIG. 8 is a side view showing features of a support bracket of the guide.
Figure 9:
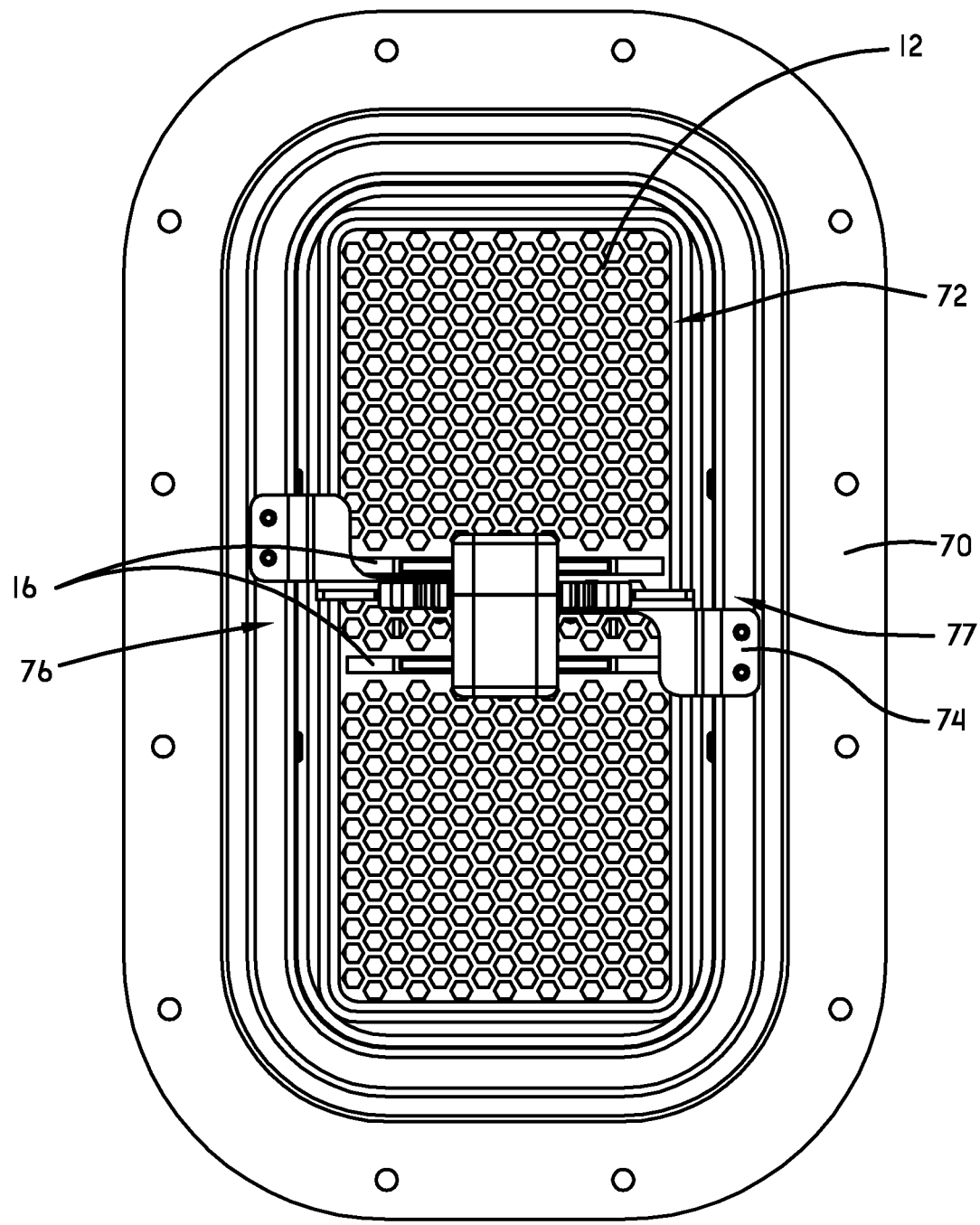
FIG. 9 is a back view showing a handle of the vent.

In order to mount the guide to the vent adjacent the screen (as illustrated in FIG. 8), the guide may include a support bracket 74. The support bracket may have a sufficient length that it is operative to be mounted to portions of the vent on either side of the screen. For example, as shown in FIG. 9, the vent may include a frame 70 with an interior area 72 that includes the screen 12. Here the support bracket 74 of the guide is mounted to opposite sides of 76, 77 of the frame in a location that extends over and between the slots 16 in the screen.

Figure 10:
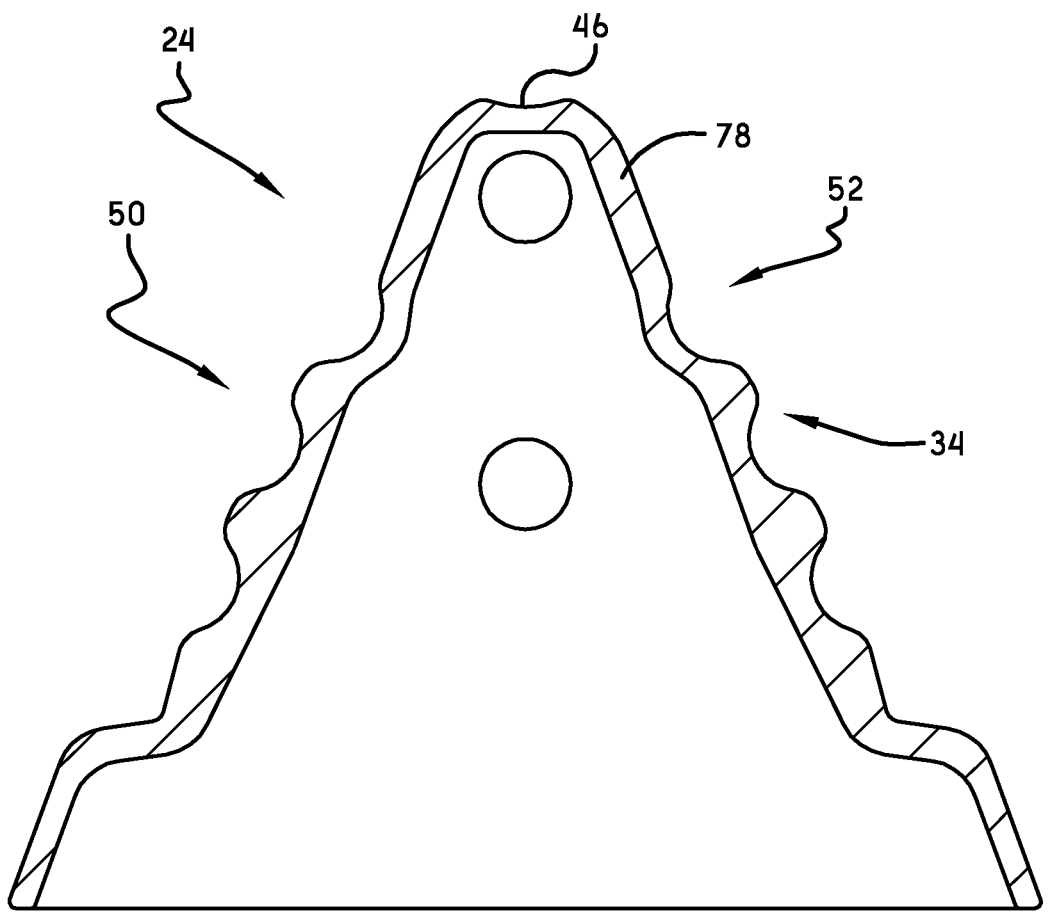
FIG. 10 is a cross-sectional view showing features of a detent cover of the guide.

As illustrated in FIG. 10, the example guide may include a detent cover 78 that is mounted so as to extend in surrounding relation of portions of the support bracket 74 (shown in FIG. 8). Such a detent cover 78 may correspond to a plastic sleeve that slides over top of the support bracket to provide a guide with an outer guide surface 34 with a configuration that includes the apex and sides of the guide described previously. For example, as shown in FIG. 7, the guide surface provided by the detent cover may include a plurality of spaced apart recesses (i.e., detents) 36 on each of the sides 50, 52 of the guide. The detent cover may also provide a detent on the apex 46 of the guide.

Figure 19:
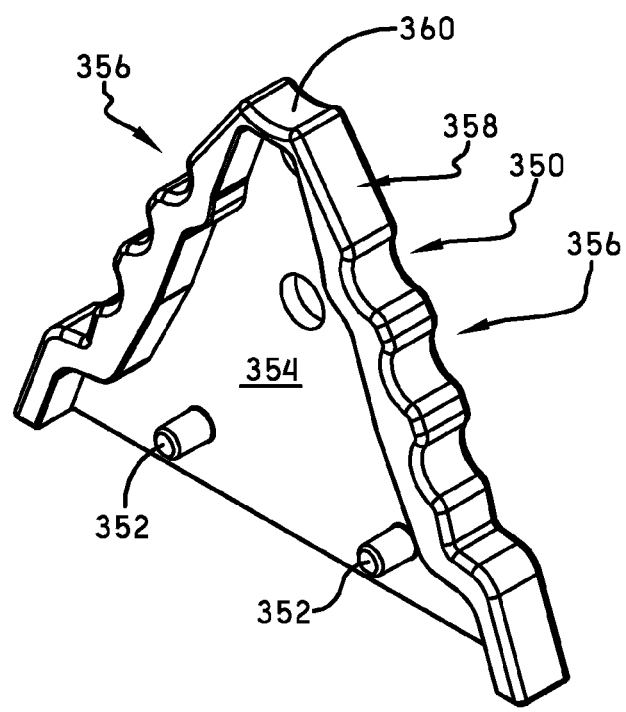
FIG. 19 is a perspective view showing features of an alternative configuration of a detent cover of the guide.

Although in this example embodiment, the guide is shown as being described as being formed from a support bracket 74 and a detent cover 78, it is to be understood that in alternative embodiments the guide may be comprised of a single part (e.g. a metal support bracket with an outer surface that corresponds to the described guide surface of the detent cover). Also in alternative embodiments, rather than having a detent cover in the form of a sleeve that slides over and encases portions of the support bracket, the detent may have other configurations that mount to the support bracket. For example, as illustrated in FIG. 19, a detent cover 350 may be configured as a side mounted component with a single side wall 354 that includes projections 352. In this embodiment, the guide may be assembled by snapping the detent cover adjacent a side of the support bracket, such that the projections 352 extend through corresponding apertures (not shown) in the support bracket to hold the guide together.

Figure 20:
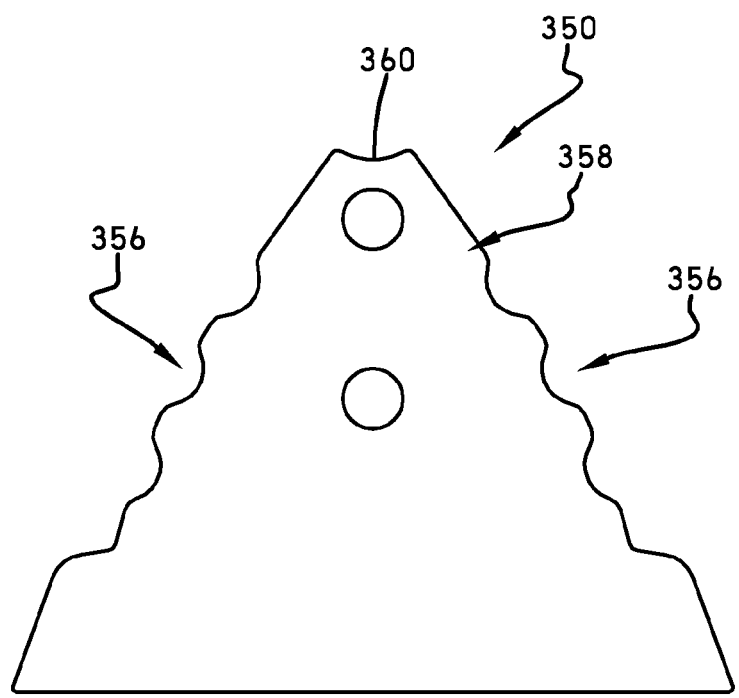
FIG. 20 is a side view showing features of the alternative detent cover of the guide.

FIG. 20 shows a side view of the alternative embodiment of the detent cover 350 shown in FIG. 19. FIG. 20 also illustrates an alternative configuration for the guide surface 356 provided by the detent cover 350. Here the guide surface includes a relatively wider upper portion 358 of the guide surface below the apex 360, compared to the narrower upper portion of the guide surface below the apex 46 of the detent cover 78 shown in FIG. 10.

In addition, although the support bracket 74 of the guide is described as being mounted to a frame that surrounds the screen, it is to be understood that alternative embodiments may have other configurations. For example, the support bracket may be mounted directly to portions of the screen intermittent of the two slots 16 through the sleeve. In addition, although the vent has been described as having a frame surrounding the screen, it is to be understood that the frame and screen may correspond to one common piece of metal (such as steel) that has been stamped to include the frame portion surrounding an interior perforated screen portion. Furthermore, in alternative embodiments the frame and screen may be separate components and/or may be made of separate materials which are mounted together using suitable fasteners (e.g., via welding, screws, rivets, or any other mechanism suitable to fasten such parts together).

Figure 11:
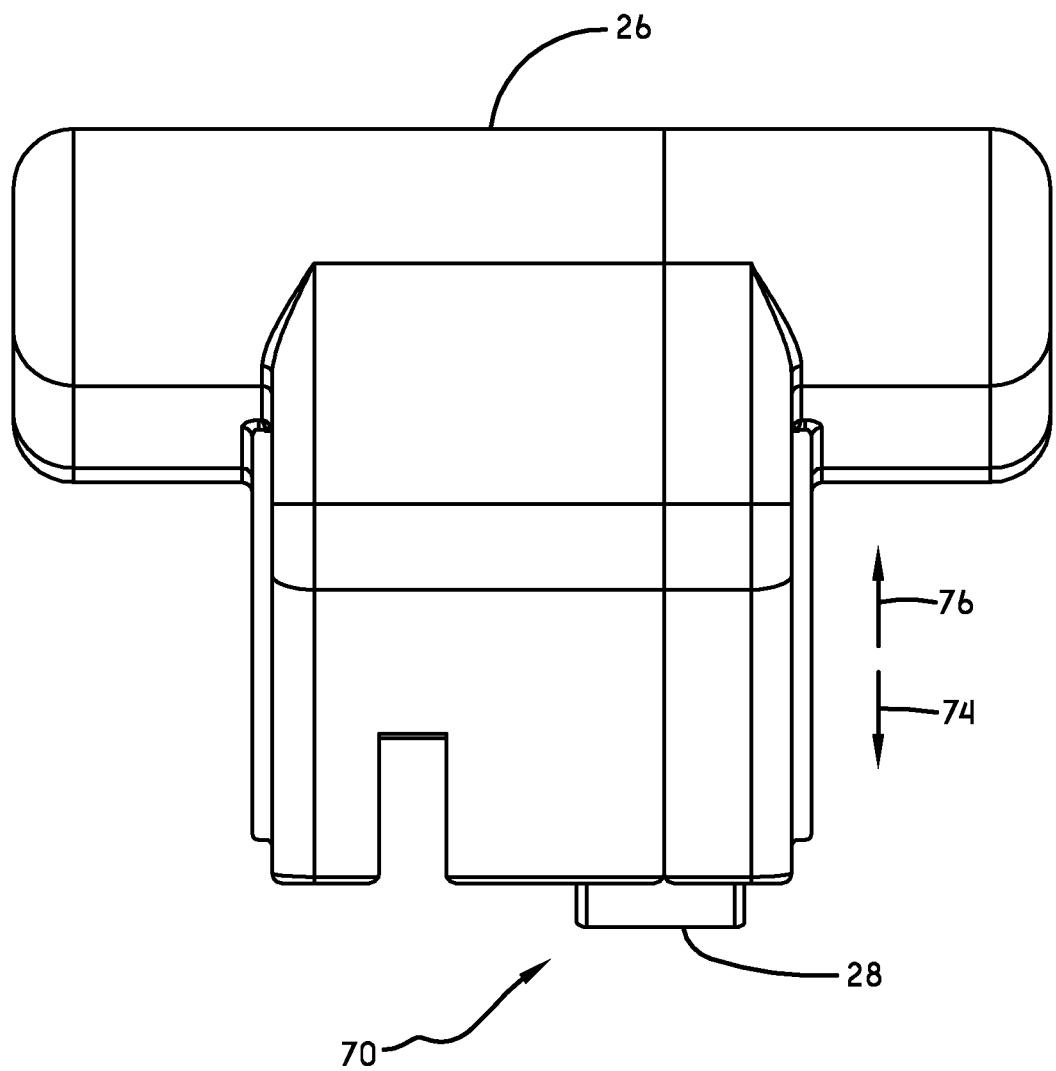
FIG. 11 is a side view of the handle with the bolt in a retracted position.
Figure 12:
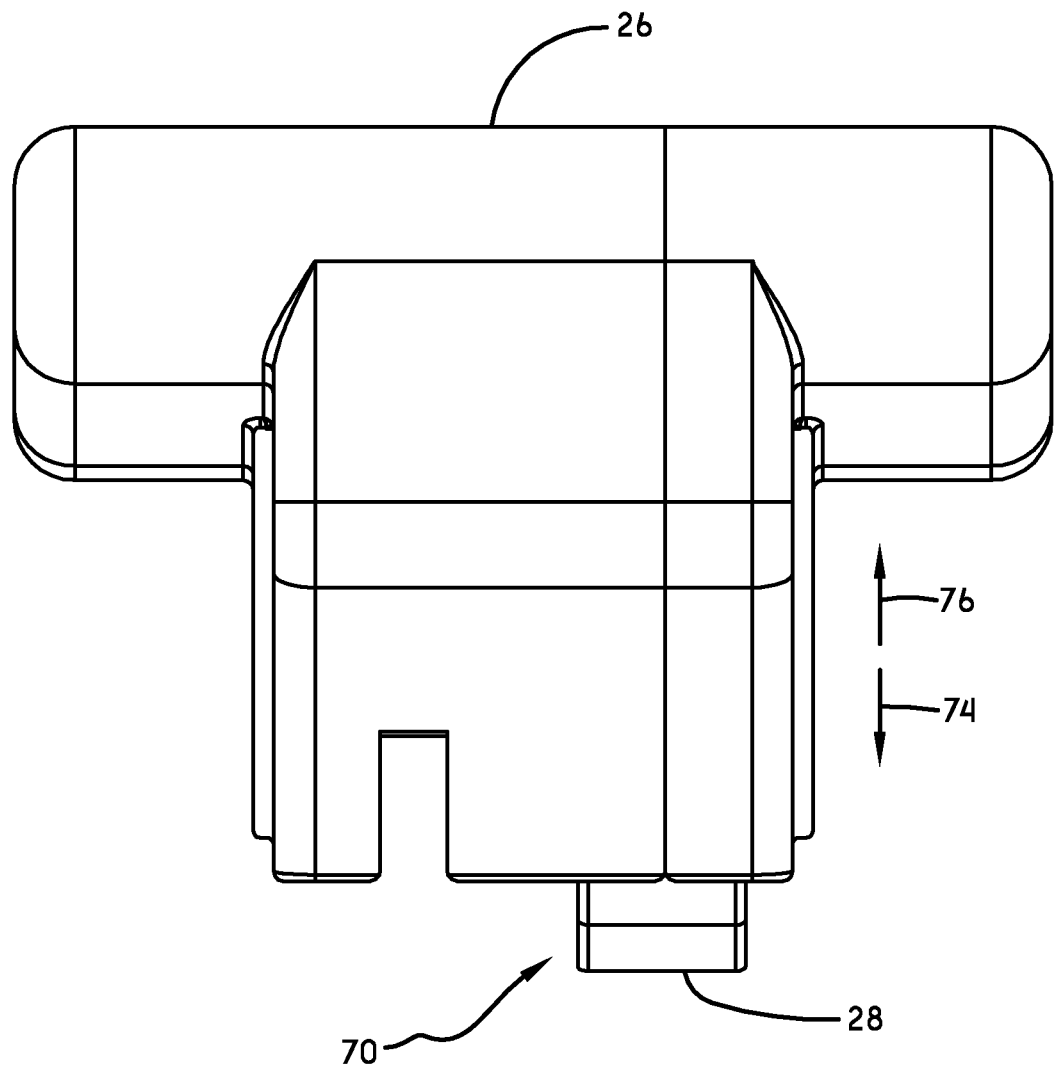
FIG. 12 is a side view of the handle with the bolt in an extended position.
Figure 13:
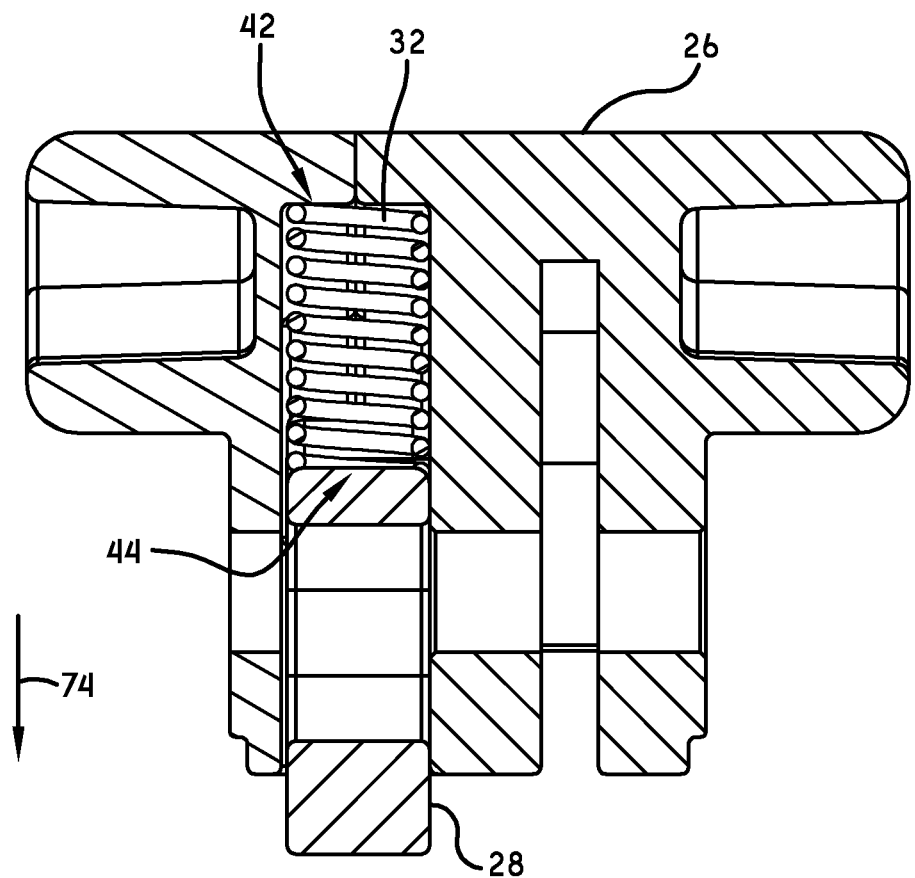
FIG. 13 is a cross-sectional view of the handle and bolt.

In example embodiments of the vent, the handle may include a movable portion that moves relative to the handle and is operative to extend into the previously described detents in the guide as the handle is moved along the guide. FIG. 11 illustrates an example embodiment of the handle 26, in which the movable portion corresponds to a movable bolt 28 that is operative to project from the handle. The bolt is operative to move relative to the handle in a first direction 74, from a retracted position 70 (shown in FIG. 11) to an extended position 72 (shown in FIG. 12). The bolt is also operative to move in an opposite second direction 76 from the extended position to the retracted position. FIG. 13 shows a cross-sectional view of the handle 26 and bolt 28. As shown in this view, the handle may include a biasing member 32 that is operative to urge the bolt to move in the first direction 74 relative to the handle. Such a biasing member may correspond to a coil spring positioned inside the handle between an interior wall 42 of the handle and a portion 44 of the bolt.

Figure 14:
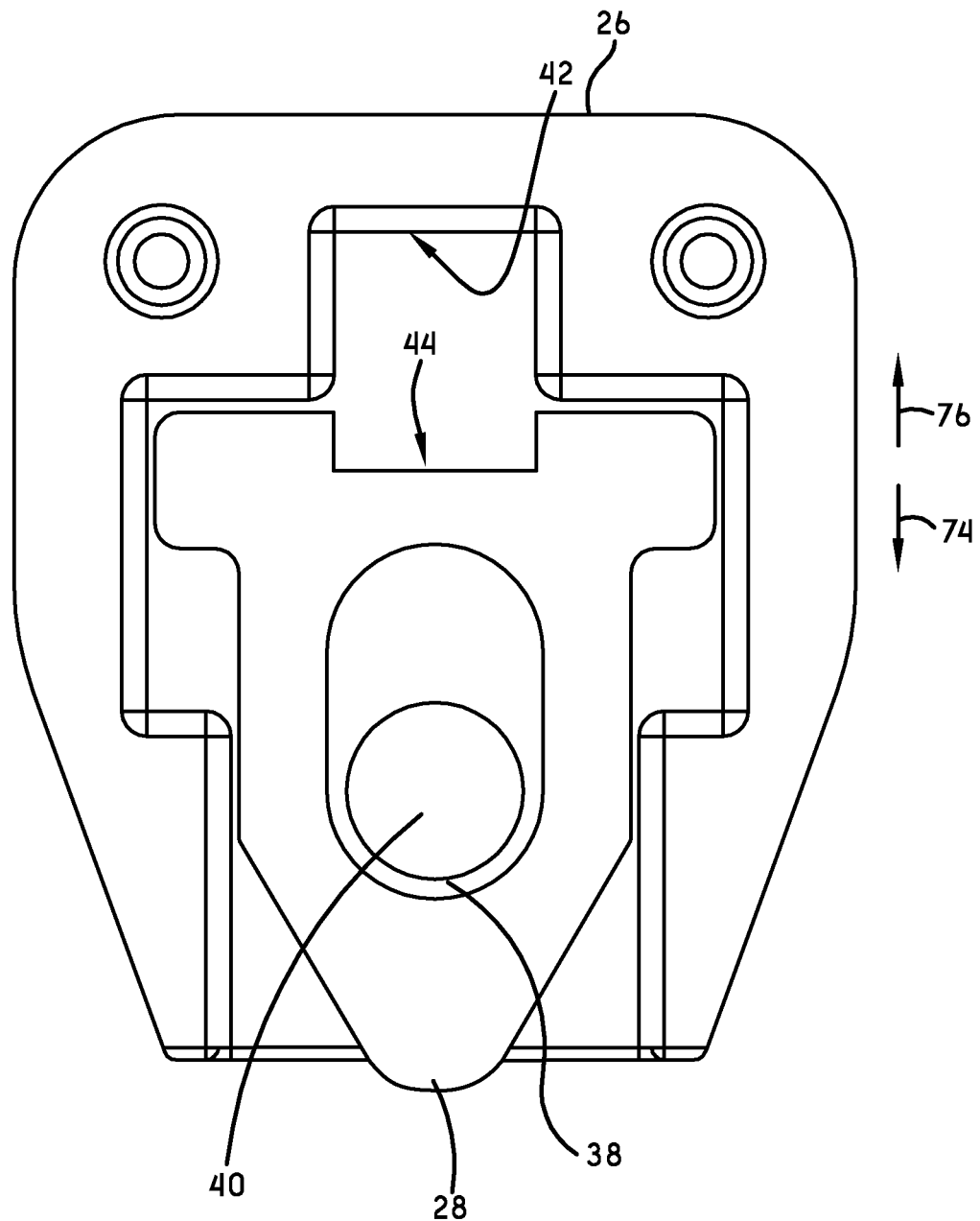
FIG. 14 is a further cross-sectional view of the handle and bolt.

FIG. 14 illustrates another cross-sectional view of the handle 26 (rotated 90 degrees compared to FIG. 13). As shown in this view, the bolt 28 may include an aperture 38 therethrough. This aperture of the bolt is elongated in the first and second directions to enable the bolt to move in the first and second directions relative a pin 40 that extends through the handle. Referring back to FIG. 1, this pin 40 extends through the arms 20, 22 of the door as well to place the handle in pivoting connection with the arms of the door. The elongated aperture in the bolt enables the bolt to slide relative to the handle and the pin 40.

Figure 21:
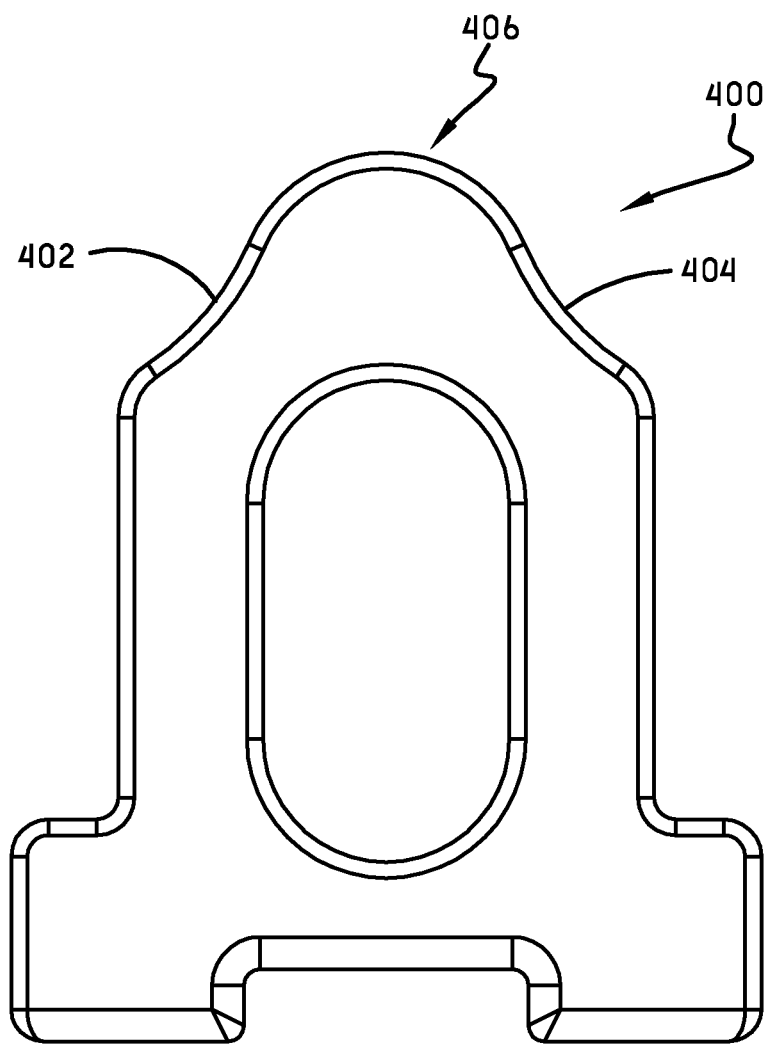
FIG. 21 is a side view showing features of an alternative configuration of a bolt.

In addition, it should be appreciated that embodiments of the bolt 28 may have alternative configurations which may vary for example depending on the desired configurations for the handle and the guide surfaces. For example, FIG. 21 illustrates an alternative configuration 400 for the bolt, in which the end of the bolt includes concaved sides 402, 404 and a relatively more blunted tip 406 compared to the bolt 28 shown in FIG. 14.

Referring back to FIG. 1, in example embodiments, the handle 26 may be in operative connection with a lever assembly 30 that extends from the handle to the guide and is in pivoting connection with the guide. In this example embodiment, as the handle moves relative to the guide to move the door between the closed position 62 (shown in FIG. 4) and the plurality of open positions 66, 68 (shown in FIGS. 5 and 6), the lever assembly 30 is adapted to maintain the handle 26 sufficiently close to the guide 24 such that the bolt is operative to slide against the guide, and move relative to the handle responsive to changes in distance between the guide and handle. Thus, the bolt will slide into and out of the recesses 36 (e.g., detents) in the guide surface 34 as the handle moves in a path along and spaced apart from the guide surface 34.

As discussed previously, the direction of the opening of the door 18 of the vent depends on which side of the guide 24 that the handle is moved. When the bolt is positioned to extend in the detent in the apex of the guide (shown in FIG. 7), the door is in the closed position (as shown in FIG. 4). In addition, as shown in FIG. 5, the exterior face 14 of the screen includes a first side 58 and an opposed second side 60. When the bolt is positioned to extend in a detent on the first side 50 of the guide, the door is in one of the plurality of open positions and extends outwardly from the second side 60 of the screen at an acute angle 66 with respect to the screen. Correspondingly as shown in FIG. 6, when the bolt is positioned to extend in a detent of the second side 52 of the guide, the door is in one of the plurality of open positions and extends outwardly from the first side 58 of the screen at an acute angle 68 with respect to the screen 12. In these example embodiment, when the door is in an open position, an edge of the door or interior surface adjacent an edge of the door (e.g. surface 100 shown in FIG. 3) may be in contact with a portion of the screen and/or frame.

In addition, it should be noted that the angles 66 and 68 at which the door 18 opens with respect to the screen, depends on which detent the bolt extends into along the sides 50, 52 of the guide. Also, it is to be understood that the configuration of the guide surface and other geometries of the vent described herein is only an example, and that alternative embodiments may have alternative configurations (e.g., different arrangement of the detents, handle, bolt, screen, door, lever assembly, etc.) that result in different angles 66 and 68 for the door with respect to the screen.

Referring back to FIG. 5, an example configuration of the lever assembly 30 is illustrated. In this example, the lever assembly includes a first lever 80 and a second lever 82. The first lever may be in rigid connection with the handle 26 and extends outwardly from the handle in the first direction 74. The second lever 82 is in pivoting connection with first lever 80 at a first pivot position 84 on the first lever that is spaced apart from the handle 26. In addition, the second lever 82 is in pivoting connection with the guide 24 at a second pivot position 86 on the guide that is spaced apart from the first pivot position 84 on the second lever 82.

Figure 15:
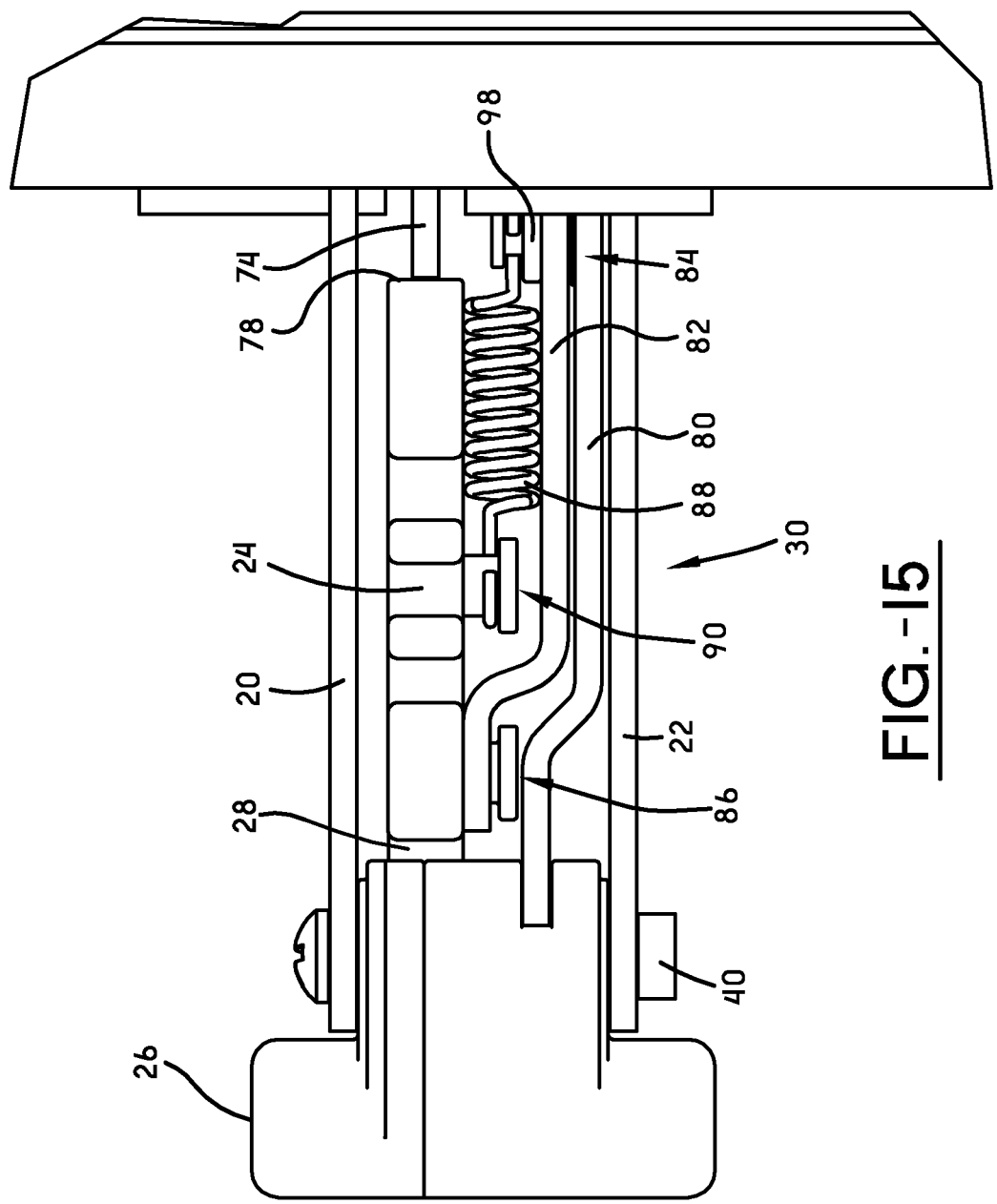
FIG. 15 is a plan view of the handle and lever assembly.

FIG. 15 shows a side view of the level assembly 30. As shown in FIG. 15, the level assembly 30 may include a biasing member such as a spring 88 extending between the first pivot position 84 and a third pivot position 90 on the guide 34 that is spaced apart from the second pivot position 86 on the guide. As shown in FIG. 7, the second pivot position 86 is located on the guide 24 adjacent the apex 46 and centered between the first and second sides 50, 52. Also the third pivot position 90 (to which the spring is mounted) is located between the second pivot position 86 and the base 48 centered between the first and second sides 50, 52.

In these example embodiments, a described pivot location corresponds to the position of the axis at which the described elements pivot with respect to each other. Pins, rivets, shafts, screws, bolts, or any other device operative to enable the elements to pivot with respect to each other may be used to connect the elements. In addition, such devices may be adapted to accommodate the attachment of other elements at the pivot location. For example, as shown in FIG. 15, a shoulder rivet 98 may be used to provide a pivoting connection between the first lever 80 and the second lever 82 as well as provide a shoulder for an end of the spring 88 to be mounted.

In example embodiments, the configuration of the lever assembly is operative to require a sufficient amount of force to initially move the bolt from the apex of the guide to a side of the guide (to open the vent door) in order to provide a default resistance to movement of the door that enables a tight weather resistant seal between the door and screen. However, once the door is opened and the bolt is positioned along the sides of the guide, the amount of force necessary to move the door at different angles (by sliding between different adjacent detents) is relatively less than the initial force to open the door. For example, the lever assembly is adapted to require use of a greater amount of force on the handle to move the bolt from (as shown in FIG. 7) the recess on the apex 46 to the first recess 92 than to move the bolt from the first recess 92 to an adjacent second recess 94.

As described herein, the movable portion of the handle has been referred to as a bolt. However it is to be understood that the use of the term bolt does not imply that this movable portion is a fastener type bolt (e.g., having threads). Rather, as used herein the term bolt encompasses any movable element that provides locking features with respect to the guide. Such locking features for example, include the ability of the bolt (in combination with the spring in the handle) to provide sufficient resistance to being moved out of a detent on the guide, so as to prevent wind forces acting on the door from moving the door to a different angular position with respect to the screen. In alternative embodiments other types of combinations of bolts and/or biasing members may be used to provide such locking features in the handle.

Figure 16:
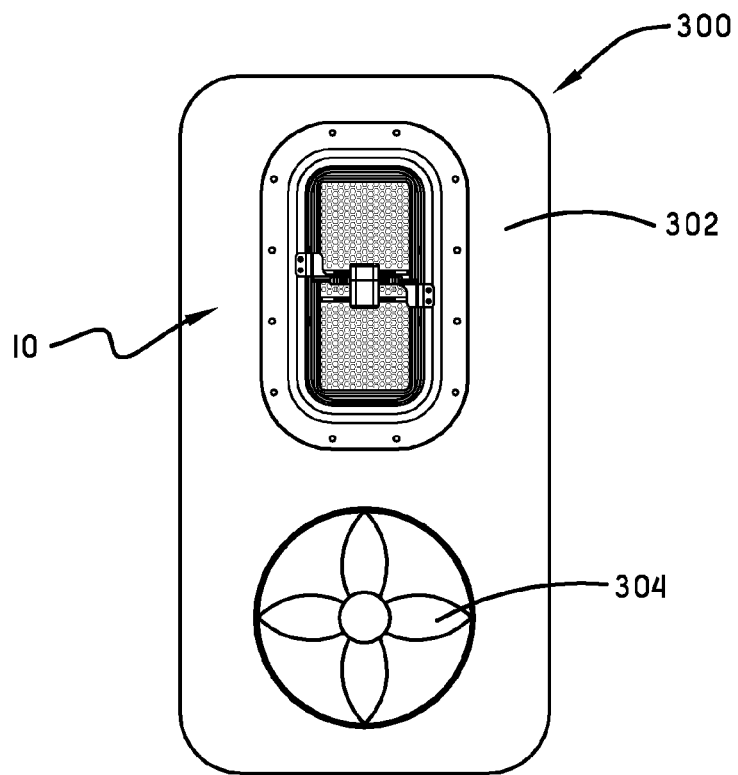
FIG. 16 is a perspective view of a vent mounted in a vehicle.

As discussed previously, embodiments of the described vent may be adapted to be mounted in a vehicle. FIG. 16 illustrates an example of a vehicle 200 that may include the described vent. Here the vehicle may include an exterior wall 202 (such as wall of the cab of the vehicle). Such a wall may be manufactured and/or modified to include an opening 204 in the wall through which the vent 10 may be mounted with the door 18 facing an area outside the vehicle. However, it is to be understood that the described vent may be used in other types of applications, such as a vent for a room of a building, or any other application that requires a vent.

Figure 17:
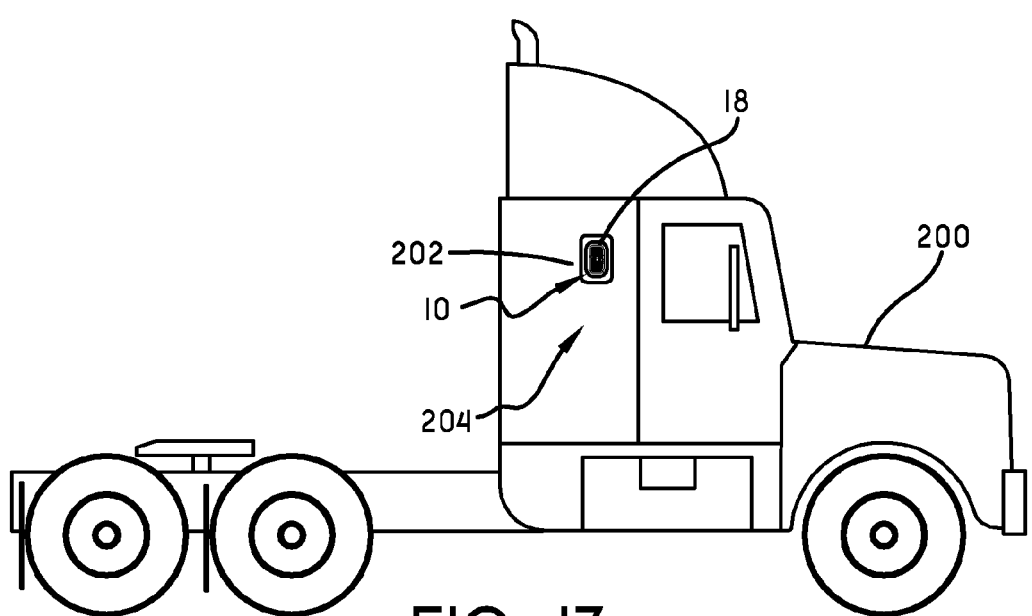
FIG. 17 is a back side view of a vent mounted in combination with a fan.
Figure 18:
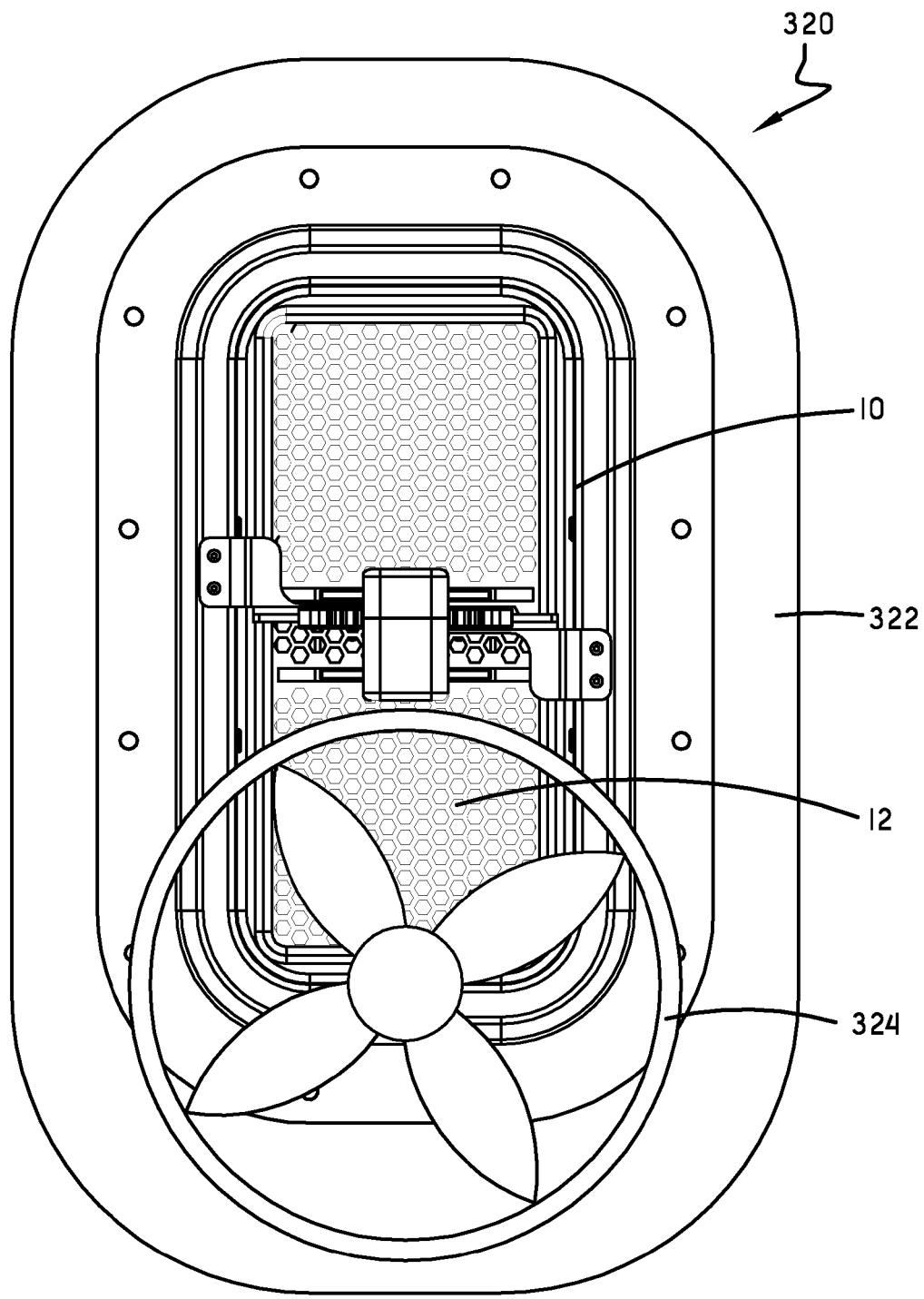
FIG. 18 is a back side view of an alternative configuration of a vent mounted in combination with a fan.

In addition, alternative embodiments of the described vent may be combined with other types of cooling elements. For example, as schematically shown in FIG. 17, an example vent apparatus 300 may include a frame 302 that is adapted to have an electric fan 304 mounted adjacent the manually operated vent 10 described previously. Also for example, as shown in FIG. 18, an example vent apparatus 320 may include a frame 322 that is adapted to have an electric fan 324 mounted to traverse (i.e. overlap) portions of the interior face of the screen 12 of the manually operated vent 10 described previously.

In the foregoing description, certain terms have been described in example embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the embodiment is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Additionally, it may be recognized that the examples provided herein may be permutated while still falling under the scope of the claims.

We claim:

1. A vent apparatus comprising:
    a frame including an opening through the frame;
    a screen mounted to the frame in a position that traverses at least a portion of the opening of the frame, wherein the screen includes an interior face, an opposed exterior face, and a plurality of perforations therethrough;
    a door adjacent the exterior face of the screen, wherein the door includes two spaced apart arms that extend through the opening through the frame;
    a guide mounted adjacent the interior face of the screen, wherein at least a portion of the guide is positioned between the spaced apart arms of the door that extend through the opening through the frame;
    a handle in pivoting connection with the spaced apart arms, wherein the handle is operative to move relative to the guide to cause the door to move between a closed position adjacent the screen to one of a plurality of open positions extending at an acute angle with respect to the screen;
    a bolt, wherein at least a portion of the bolt is positioned in the handle, wherein the bolt is operative to move with respect to the handle and is operative to project from the handle, wherein the bolt is operative to move relative to the handle in a first direction from a retracted position to an extended position, wherein the bolt is operative to move relative to the handle in a second direction opposite the first direction relative to the handle from the extended position to the retracted position, wherein the bolt includes an aperture therethrough, wherein the handle includes a pin that extends through the two arms, the handle and the aperture of the bolt, wherein the aperture of the bolt is elongated in the first and second directions, wherein the bolt is operative to move in the first direction and the second direction relative to the pin and the handle;
    a lever assembly extending from the handle to the guide, wherein the lever assembly is in pivoting connection with the guide, wherein as the handle moves relative to the guide to move the door between the closed position and the plurality of open positions, the lever assembly is adapted to maintain the handle sufficiently close to the guide such that the bolt is operative to slide along the guide, and move relative to the handle responsive to changes in distance between the guide and handle.

2. The apparatus according to claim 1, wherein the handle includes a biasing member that urges the bolt to move in the first direction relative the handle from the retracted position to the extended position, wherein the guide includes a guide surface, wherein the guide surface includes a plurality of recesses, wherein as the handle moves relative to the guide to move the door between the closed position and the plurality of open positions, the lever assembly is adapted to maintain the handle sufficiently close to the guide such that the bolt is operative to move relative to the handle and slide into and out of the recesses.

3. The apparatus according to claim 2, wherein the guide has an apex, a base, and two opposed first and second sides that extend from the apex to the base, wherein the apex has a length that is narrower than a length of the base, wherein the first and second sides and apex include the guide surface, wherein the screen includes a first side and an opposed second side, wherein when the bolt is adjacent the apex, the door is in the closed position, wherein when the bolt is adjacent the first side of the guide, the door is in one of the plurality of open positions and extends outwardly at an acute angle from the second side of the screen, wherein when the bolt is adjacent the second side of the guide, the door is in another one of the plurality of open positions and extends outwardly at an acute angle from adjacent the first side of the screen.

4. The apparatus according to claim 3, wherein the guide includes a support bracket mounted to opposed sides of the frame in a location that extends over at least one of the screen, the opening through the frame, or a combination thereof.

5. The apparatus according to claim 4, wherein the guide includes a plastic detent cover that extends around the support bracket, wherein the detent cover includes the guide surface.

6. The apparatus according to claim 5, wherein the detent cover includes the first and second sides of the guide, wherein each of the first and second sides includes a plurality of spaced apart detents.

7. The apparatus according to claim 2, wherein the lever assembly includes a first lever and a second lever, wherein the first lever is in rigid connection with the handle and extends outwardly from the handle in the first direction, wherein the second lever is in pivoting connection with the first lever at a first pivot position on the first lever that is spaced apart from the handle, wherein the second lever is in pivoting connection with the guide at a second pivot position on the guide that is spaced apart from the first pivot position.

8. The apparatus according to claim 7, further comprising a spring extending between the first pivot position and a third pivot position on the guide that is spaced apart from the second pivot position.

9. The apparatus according to claim 8, wherein the guide has an apex, a base, and two opposed first and second sides that extend from the apex to opposed sides of the base, wherein the apex has a length that is narrower than a length of the base, wherein the first and second sides and apex include the guide surface, wherein the second pivot position is located on the guide adjacent the apex and centered between the first and second sides, wherein the third pivot position is located between the second pivot position and the base centered between the first and second sides.

10. The apparatus according to claim 9, wherein the handle is operative to move relative to the guide to cause the bolt to slide from the apex to a first recess on the first side of the guide and to slide from the first recess to a second recess on the first side of the guide, wherein the first recess is in between the apex and the second recess, wherein the lever assembly is adapted to require use of a greater amount of force on the handle to move the bolt from the apex to the first recess than to move the bolt from the first recess to the second recess.

11. The apparatus according to claim 1, further comprising a vehicle, wherein the vehicle includes an exterior wall, wherein the screen is located adjacent an opening through the exterior wall, wherein the door faces an area outside the vehicle.

12. The apparatus according to claim 1, further comprising a frame and an electric fan, wherein the screen and electrical fan are mounted in operatively supporting connection with the frame such that at least a portion of the electric fan traverses a portion of the interior face of the screen.

13. A vent apparatus comprising:
    a frame including an opening through the frame;
    a screen mounted to the frame in a position that traverses at least a portion of the opening of the frame, wherein the screen includes an interior face, an opposed exterior face, and a plurality of perforations therethrough;

a door adjacent the exterior face of the screen, wherein the door includes at least one arm that extends through the opening through the frame;

a guide mounted adjacent the interior face of the screen;

a handle in pivoting connection with the at least one arm, wherein the handle is operative to move relative to the guide to cause the door to move between a closed position adjacent the screen to one of a plurality of open positions extending at an acute angle with respect to the screen, wherein the handle includes a movable portion;

a lever assembly extending from the handle to the guide, wherein the lever assembly is in pivoting connection with the guide, wherein as the handle moves relative to the guide to move the door between the closed position and the plurality of open positions, the lever assembly is adapted to maintain the handle sufficiently close to the guide such that a movable portion of the handle is operative to slide along the guide, wherein the lever assembly includes a first lever and a second lever, wherein the first lever is in rigid connection with the handle and extends outwardly from the handle in the first direction, wherein the second lever is pivotally connected with the first lever at a first pivot point on the first lever that is spaced apart from the handle, wherein the second lever is pivotally connected with the guide at a second pivot point on the guide that is spaced apart from the first pivot point.

14. The apparatus according to claim 13, wherein the movable portion of the handle includes a bolt positioned therein, wherein the bolt is operative to move relative to the handle in a first direction from a retracted position to an extended position, wherein the bolt is operative to move relative to the handle in a second direction opposite the first direction relative to the handle from the extended position to the retracted position, wherein the handle includes a biasing member that urges the bolt to move in the first direction relative the handle from the retracted position to the extended position, wherein the guide includes a guide surface, wherein the guide surface includes a plurality of recesses, wherein as the handle moves relative to the guide to move the door between the closed position and the plurality of open positions, the lever assembly is adapted to maintain the handle sufficiently close to the guide such that the bolt is operative to move relative to the handle and slide into and out of the recesses.

15. The apparatus according to claim 13, wherein the lever assembly does not include any portion of the door, further comprising a spring including a first end and a second end, wherein the first end of the spring is connected to the guide, wherein the second end of the spring is connected to the lever assembly.

16. The apparatus according to claim 14, wherein the bolt includes an aperture therethrough, wherein the handle includes a pin that extends through the at least one arm, the handle and the aperture of the bolt, wherein the aperture of the bolt is elongated in the first and the second directions, wherein the bolt is operative to move in the first direction and the second direction relative to the pin and the handle.

17. The apparatus according to claim 16, wherein the biasing member includes a spring positioned inside the handle between an interior wall of the handle and a portion of the bolt.

* * * * *